US010858111B2

(12) United States Patent
Lin et al.

(10) Patent No.: US 10,858,111 B2
(45) Date of Patent: Dec. 8, 2020

(54) PASSENGER SEAT RECONFIGUREABLE FOR SEATING OR STORAGE

(71) Applicant: B/E Aerospace, Inc., Winston-Salem, NC (US)

(72) Inventors: Horng Jaan Lin, Winston-Salem, NC (US); Glenn A. Johnson, Rural Hall, NC (US); Charles Martin Hansson, Winston-Salem, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 54 days.

(21) Appl. No.: 16/243,360

(22) Filed: Jan. 9, 2019

(65) Prior Publication Data

US 2020/0216178 A1 Jul. 9, 2020

(51) Int. Cl.
*B64D 11/06* (2006.01)

(52) U.S. Cl.
CPC ........ *B64D 11/0639* (2014.12); *B64D 11/062* (2014.12); *B64D 11/064* (2014.12); *B64D 11/0606* (2014.12)

(58) Field of Classification Search
CPC ............ B64D 11/0639; B64D 11/0606; B64D 11/062; B64D 11/064; B64D 11/06; B60N 2/203; B61D 33/0028
USPC .......................................................... 297/94
See application file for complete search history.

(56) References Cited

U.S. PATENT DOCUMENTS

| | | | | |
|---|---|---|---|---|
| 6,494,531 B1 * | 12/2002 | Kim | ...................... | B60N 2/0284 296/64 |
| 8,740,297 B1 * | 6/2014 | Foss | ...................... | B60N 2/143 297/354.11 |
| 2005/0253433 A1 | 11/2005 | Brown et al. | | |
| 2011/0148167 A1 * | 6/2011 | Westerink | .............. | B64D 11/06 297/354.12 |

FOREIGN PATENT DOCUMENTS

WO     2011077363 A2     6/2011

OTHER PUBLICATIONS

Office Action dated May 29, 2020 for EP Application No. 19211098.

* cited by examiner

*Primary Examiner* — Mark R Wendell
(74) *Attorney, Agent, or Firm* — Suiter Swantz pc llo

(57) ABSTRACT

An aircraft passenger seat including decoupled seat back and seat bottom elements configured to be selectively positioned with respect to spaced seat elements to allow the seat to be used for seating or storage as desired. The passenger seat is convertible by repositioning the seat back and seat bottom elements to provide conventional forward-facing seating, face-to-face seating with a longitudinally aligned and adjacent seat, or seat storage as desired. The seat back and seat bottom elements track along a track assembly affixed along facing inboard sides of fixed seat elements such as arm rest assemblies.

10 Claims, 7 Drawing Sheets

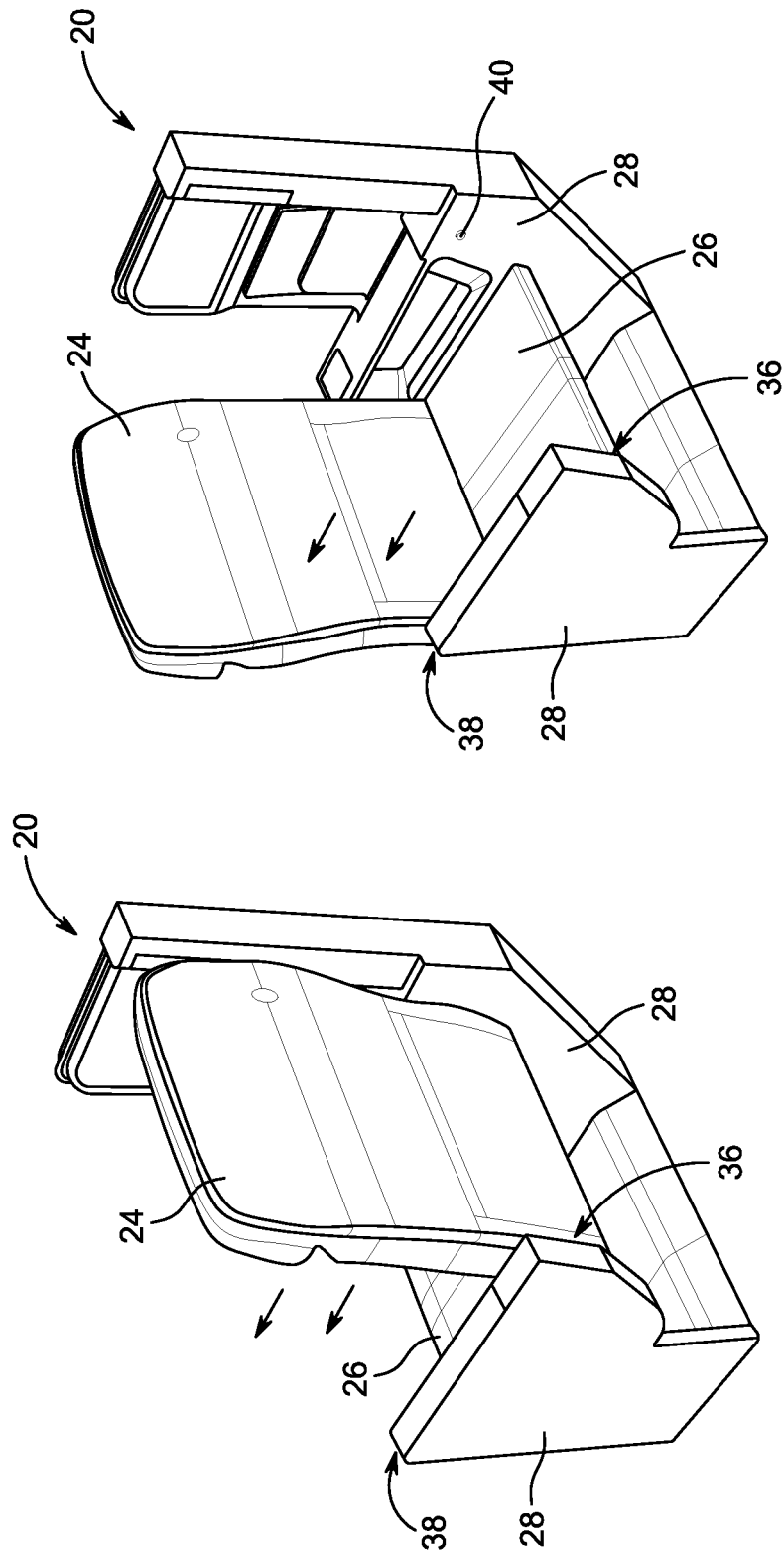

PASSENGER SEAT RECONFIGUREABLE FOR SEATING OR STORAGE

BACKGROUND

Conventional passenger seats, such as aircraft passenger seats, are constructed for seating in one facing direction and are not reconfigurable for other purposes. Conventional seat constructions typically include a seat back wherein the degree of recline is determined by the seat pitch. For example, seat back recline in basic economy seating classes is limited to a shallow recline because of the short seat pitch, while seat back recline may be greater in premium economy seating classes with greater spacing between rows. In either of these seating classes, while the seat back may pivot to recline, the bottom end of the seat back is fixed in position with respect to the seat frame. Like the seat back, the back end of the seat bottom is also fixed in position relative to the seat frame, although the front end of the seat bottom may tilt slightly with seat back recline to enhance comfort during flight.

In certain situations seats may be unoccupied. In these situations, it would be desirable to use the seat for a purpose other than seating. Considering the limited amount of under-seat storage in economy and premium economy seating classes, and the limited storage space in overhead bins, it would be desirable to use an unoccupied seat to store large objects, pet carriers, pets, etc. In other situations, passengers traveling together may be seated in longitudinally-adjacent seats. In these situations, it would be desirable for the passengers to face each other to converse during flight. In yet other situations, an unoccupied seat could be used to expand the seating area of a longitudinally-adjacent seat, both to enhance comfort for the traveling passenger and to recoup lost revenue for the carrier for an unoccupied seat. While such alternative uses for a passenger seat are desirable, conventional seat constructions do not allow for such configurations.

Accordingly, what is needed is a seat construction in which the seat back and seat bottom elements can be selectively repositioned to allow the passenger seat to be used for unconventional seating or storage as desired. A desirable passenger seat construction would be convertible by repositioning one or more of the seat back and seat bottom elements to provide conventional forward-facing seating, face-to-face seating with a longitudinally aligned and adjacent seat, or seat storage as desired.

SUMMARY OF THE INVENTIVE ASPECTS

In one aspect, embodiments of the inventive concepts disclosed herein are directed to a convertible passenger seat including spaced arm assemblies, a seat back configured to track between the spaced arm assemblies between a first position near an aft end of the spaced arm assemblies and a second position near a forward end of the spaced arm assemblies, and a seat bottom configured to track between the spaced arm assemblies between a first position between the spaced arm assemblies and a second position at the forward end of the spaced arm assemblies, wherein the first position of the seat back together with the first position of the seat bottom corresponds to a forward-facing seat configuration, the second position of the seat back together with the first position of the seat bottom corresponds to a rear-facing seat configuration or an ottoman configuration, and the second position of the seat back together with the second position of the seat bottom corresponds to a storage configuration.

In some embodiments, the seat back may be erect in each of the first and second positions of the seat back, the seat bottom may be prone in the first position of the seat bottom, and the seat bottom may be erect in the second position of the seat bottom.

In some embodiments, the seat back and the seat bottom may be decoupled to move independently between their respective first and second positions.

In some embodiments, the passenger seat may further include a track assembly including seat back guide tracks affixed along facing inboard sides of the spaced arm assemblies along which seat back trunnions engaged therein travel as the seat back tracks between the first and second positions of the seat back, and seat bottom guide tracks affixed along facing inboard sides of the spaced arm assemblies along which seat bottom trunnions engaged therein travel as the seat bottom tracks between the first and second positions of the seat bottom.

In some embodiments, the seat back guide tracks may be disposed spaced above the seat bottom guide tracks such that the seat back tracks above the seat bottom.

In some embodiments, the passenger seat may include a seat belt having opposed ends slidably engaged in the seat back guide tracks or the seat bottom guide tracks, the seat belt usable as a seat belt or a securement strap in any combination of the first and second positions of the seat back and the seat bottom.

In some embodiments, the passenger seat may include seat back locking points on facing inboard sides of the aft and forward ends of the spaced arm assemblies in which seat back trunnions engage therein lock the seat back in place in the first or second position of the seat back.

In some embodiments, the passenger seat may include a seat frame including spaced spreaders and a plurality of transverse beams, wherein at least one of the plurality of transverse beams is accessible as a tie-down point for securing items when the seat bottom and the seat back are each in their respective second position.

In some embodiments, the passenger seat may include a base covering at least two of the transverse beams for supporting an item placed thereon when at least the seat bottom is in the second position.

In some embodiments, the passenger seat may include a privacy partition affixed atop one of the spaced arm assemblies, the privacy partition extending upwardly to about a height of a top of the seat back and forward at least partway along a length of the one of the spaced arm assemblies.

In another aspect, the inventive concepts disclosed herein are directed to an aircraft passenger seat arrangement including like first and second passenger seats positioned spaced apart, longitudinally aligned, and facing in a common direction within an aircraft seating class. Each of the first and second passenger seats includes spaced arm rest assemblies, a seat back configured to track between the spaced arm rest assemblies between a first position locked in place near an aft end of the spaced arm rest assemblies and a second position locked in place near a forward end of the spaced arm rest assemblies, and a seat bottom configured to track between the spaced arm rest assemblies between a first position locked in place between the spaced arm rest assemblies and a second position locked in place near the forward end of the spaced arm rest assemblies. Regarding the first passenger seat, the first position of the seat back together with the first position of the seat bottom corresponds to a forward-facing seat configuration, the second position of the seat back together with the first position of the seat bottom corresponds to a rear-facing seat configuration facing the second passenger seat or an ottoman configuration for use by the second passenger seat, and the second position of the seat back together with the second position of the seat bottom corresponds to a storage configuration of the first passenger seat.

In some embodiments, regarding each of the first and second passenger seats the seat back may be erect in each of the first and second positions of the seat back, the seat bottom may be prone in the first position of the seat bottom, and the seat bottom may be erect in the second position of the seat bottom.

In some embodiments, regarding each of the first and second passenger seats the seat back and the seat bottom may be decoupled to move independently between their respective first and second positions.

In some embodiments, each of the first and second passenger seats may further include a track assembly including seat back guide tracks affixed along facing inboard sides of the spaced arm assemblies along which seat back trunnions engaged therein travel as the seat back tracks between the first and second positions of the seat back, and seat bottom guide tracks affixed along facing inboard sides of the spaced arm assemblies along which seat bottom trunnions engaged therein travel as the seat bottom tracks between the first and second positions of the seat bottom.

In some embodiments, the seat back guide tracks may be disposed above the seat bottom guide tracks such that the seat back tracks above the seat bottom.

In some embodiments, each of the first and second passenger seats may further include a seat belt having opposed ends slidably engaged in the seat back guide tracks or the seat bottom guide tracks, the seat belt usable as a seat belt or a securement strap in any combination of the first and second positions of the seat back and the seat bottom.

In some embodiments, each of the first and second passenger seats may further include a seat frame including spaced spreaders and a plurality of transverse beams, wherein at least one of the plurality of transverse beams is accessible as a tie-down point for securing items when the seat bottom and the seat back are each in their respective second position.

In some embodiments, each of the first and second passenger seats may further include a privacy partition affixed atop one of the spaced arm assemblies, the privacy partition extending upwardly to about a height of a top of the seat back and forward at least partway along a length of the one of the spaced arm assemblies.

In yet another aspect, the inventive concepts disclosed herein are directed to a passenger reconfigurable for seating or storage including fixed seat elements positioned spaced apart, a seat back supported between the fixed seat elements configured to track between a first position locked in place near an aft end of the fixed seat element and a second position locked in place near a forward end of the fixed seat elements, and a seat bottom supported between the fixed seat elements configured to track between a first position secured between the fixed seat elements and a second position secured at the forward end of the fixed seat elements, wherein the seat back remains erect as the seat back tracks between the first and second positions of the seat back, the seat bottom transitions from prone to erect as the seat bottom tracks from the first position to the second position of the seat bottom, and wherein the first position of the seat back together with the first position of the seat bottom corresponds to a forward-facing seat configuration, the second position of the seat back together with the first position of the seat bottom corresponds to a rear-facing seat configuration or an ottoman configuration, and the second position of the seat back together with the second position of the seat bottom corresponds to a storage configuration.

In some embodiments, the passenger seat may include seat back guide tracks affixed along facing inboard sides of the fixed seat elements along which seat back trunnions engaged therein travel as the seat back tracks between the first and second positions of the seat back, and seat bottom guide tracks affixed along facing inboard sides of the fixed seat elements along which seat bottom trunnions engaged therein travel as the seat bottom tracks between the first and second positions of the seat bottom, wherein the seat back guide tracks are disposed spaced above the seat bottom guide tracks such that the seat back movement is decoupled from seat bottom movement and the seat back tracks above the seat bottom.

Embodiments of the inventive aspects can include one or more or any combination of the above aspects, features and configurations.

BRIEF DESCRIPTION OF THE DRAWINGS

Implementations of the inventive concepts disclosed herein may be better understood when consideration is given to the following detailed description thereof. Such description refers to the included drawings, which are not necessarily to scale, and in which some features may be exaggerated, and some features may be omitted or may be represented schematically in the interest of clarity. Like reference numbers in the drawings may represent and refer to the same or similar element, feature, or function. In the drawings:

FIG. 3 is a rear perspective view of one of the passenger seats of FIG. 1 showing seat back tracking from the first position;

FIG. 4 is a front perspective view of the passenger seat of FIG. 3 showing seat back tracking to the second position;

DETAILED DESCRIPTION OF EXEMPLARY EMBODIMENTS

Figure 1:
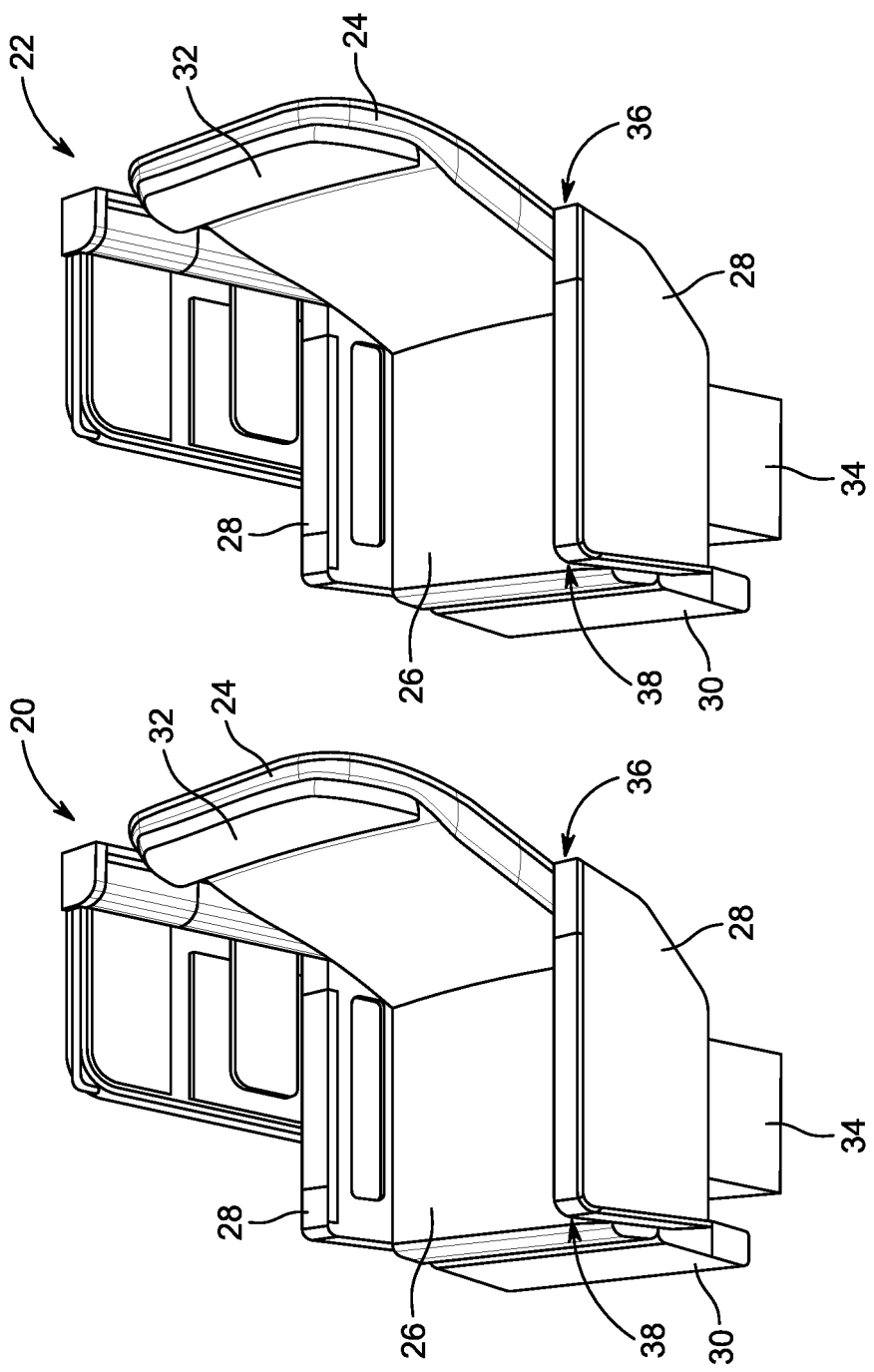
FIG. 1 is a side perspective view of two like longitudinally-aligned passenger seats reconfigurable for seating or storage according to the inventive aspects disclosed herein.

The inventive concepts are described hereinafter with reference to the accompanying drawings in which exemplary embodiments are shown. However, the inventive concepts may be embodied in many different forms and should not be construed as limited to the representative embodiments set forth herein.

Referring to the drawings, aircraft passenger seats are shown constructed to be selectively reconfigurable for forward-facing seating, rear-facing seating, an ottoman, or storage as desired. In certain situations, such as a full flight or during taxi, takeoff and landing (TTOL), it may be desired for each passenger seat to be configured forward-facing seating. In other situations, such as during flight, it may be desired to configure a passenger seat for rear-facing for facing communication with a longitudinally-adjacent seated passenger. In other configurations, such as during flight and when a seat is unoccupied, it may be desired to configure a seat for use an ottoman serving a longitudinally-adjacent seat. In yet other situations, such as when storage of large items or pets is needed and when a seat is unoccupied, it may be desired to configure a passenger seat for storage. The passenger seats disclosed herein are reconfigurable to achieve each of the foregoing configurations by way of a decoupled seat back and seat bottom configured to track between spaced seat elements such as arm assemblies or other fixed seat elements or frame members.

Disclosed herein is a reconfigurable passenger seat for an aircraft or other conveyance, as well as a passenger seating arrangement including two or more like reconfigurable passenger seats. In some embodiments, a cabin configuration according to one inventive aspect may include at least two like first and second passenger seats facing in a common direction and longitudinally-aligned. The at least two seats may be forward-facing and parallel to the longitudinal aircraft axis, rear-facing and parallel to the longitudinal aircraft axis, forward-facing generally facing the window or aisle and at an angle to the longitudinal aircraft axis, or rear-facing generally facing the window or aisle and at an angle to the longitudinal aircraft axis. In another cabin configuration, the seating arrangement includes a plurality of like passenger seat arranged in rows and columns of laterally-aligned and longitudinally-aligned passenger seats, respectively. In both the former and latter cabin configurations, regarding each longitudinally-adjacent pair of passenger seats, each "forward" seat can be reconfigured to be rear-facing, can be reconfigured into an ottoman, or can be reconfigured for object storage, while each "aft" seat can be reconfigured for object storage. Other seating configurations including passenger seats according to the inventive concepts disclosed herein are envisioned, and the present disclosure does not limit the cabin seating arrangement to any particular configuration.

Referring to FIG. 1, two like first and second reconfigurable or convertible passenger seats are shown generally at reference numerals 20 and 22. The first and second passenger seats 20 and 22 are alike to promote the use of a universal seat construction and uniformity in the passenger cabin. The passenger seats may be, for example, premium economy passenger seats. Each passenger seat 20, 22 generally includes a seat back 24 and a seat bottom 26 disposed between a pair of spaced seat elements, such as arm assemblies or arm rest assemblies, shown generally at reference numeral 28. The seat back 24 and seat bottom 26 are each coupled to the spaced seat elements to support the respective seat back and seat bottom along both sides. Each passenger seat 20, 22 may optionally include a leg rest 30. A headrest 32 may be part of the seat back 20 or may be separate from the seat back and adjustable relative thereto. Each passenger seat 20, 22 further includes a seat base or base frame 34 discussed in detail below.

Passenger seats 20, 22 are each shown with their respective seat back 24 and seat bottom 26 in a first position corresponding to a forward-facing seat configuration, wherein the term "forward" is relative to the seat construction and not necessarily the direction of aircraft travel. The seat back 24 is configured to track between the spaced arm assemblies 28 between a first position near an aft end 36 of the spaced arm assemblies and a second position near a forward end 38 of the spaced arm assemblies. The seat bottom 26 is also configured to track between the spaced arm assemblies 28 between a first position between the spaced arm assemblies and a second position at the forward end 38 of the spaced arm assemblies. FIG. 1 shows, regarding each passenger seat 20, 22, the first position of the seat back 24 together with the first position of the seat bottom 26 corresponding to forward-facing seat configurations, for example, forward-facing and upright sitting positions for TTOL.

Figure 2:
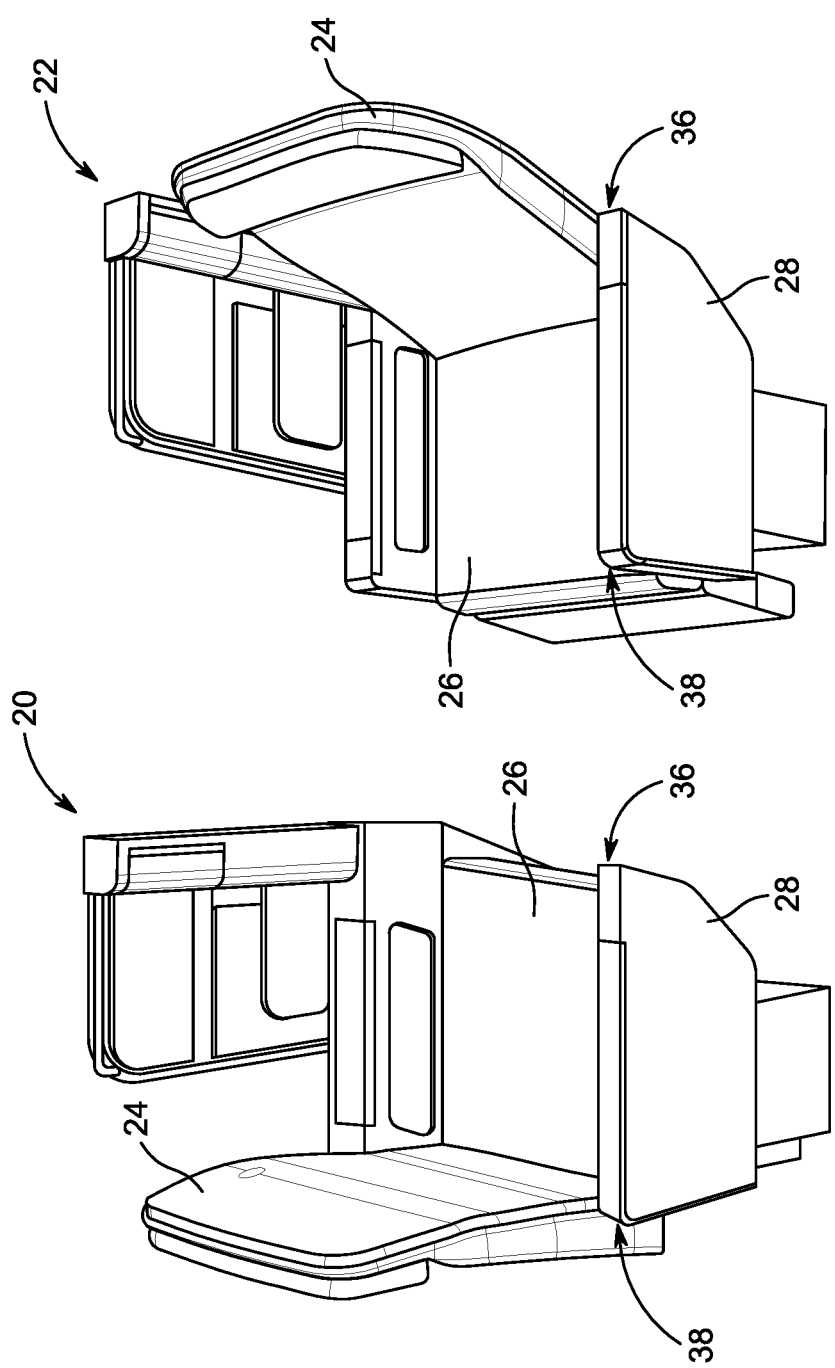
FIG. 2 is a side perspective view of the passenger seats of FIG. 1 showing the left seat reconfigured for rear-facing seating or an ottoman for use by the right seat.

Referring to FIG. 2, the left or "forward" passenger seat 20 is shown reconfigured or converted to a rear-facing seat configuration or ottoman configuration. As shown, the seat back 24 is tracked to the second position near the forward end 38 of the arm assemblies 28 while the seat bottom 26 remain in the first position. Thus, the second position of the seat back 24 together with the first position of the seat bottom 26 corresponds to a rear-facing seat configuration or an ottoman configuration. As a rear-facing seat, a passenger can sit on the seat bottom 26 and support their back against the backside of the seat back 26 to allow facing conversation with the longitudinally-adjacent "aft" passenger seat 22. As an ottoman configuration, the passenger seated in the "aft" passenger seat 22 can use the seat bottom 26 of the "forward" passenger seat 20 as an ottoman to enhance comfort and expand their passenger living space.

Referring to FIGS. 3 and 4, the seat back 24 remains erect as the seat back tracks between the first and second positions. The seat back 24 and the seat bottom 26 are decoupled such that the two move independently between their respective first and second positions. The seat back 24 can be moved from the first position shown in FIG. 3, corresponding to the forward-facing seat configuration, to the second position shown in FIG. 4, corresponding to the rear-facing seat configuration, by unlocking the seat back from the first position and moving the seat back to the second position. Movement may be manual by pushing or automatic by an actuated system operable by actuating a seat control. The seat back 24 locks in each of the first and second positions while retaining the ability to recline from upright in the first position. In some embodiments, seat back locking points 40 are disposed on facing inboard sides of the aft and forward ends of the spaced arm assemblies 28 in which seat back trunnions, for example, engage therein to lock the seat back in place in the first or second position of the seat back. In other embodiments, the seat back locking points 40 may include trunnions disposed on the facing inboard sides of the aft and forward ends of the spaced arm assemblies 28 that engage within elongate tracks on the opposing sides of the seat back, the elongate track length determining the amount of allowable travel of the seat back and consequently the amount of seat back recline. Other types of locking points other than those mentioned may be utilized to lock the seat back in each of its first and second positions.

Figure 6:
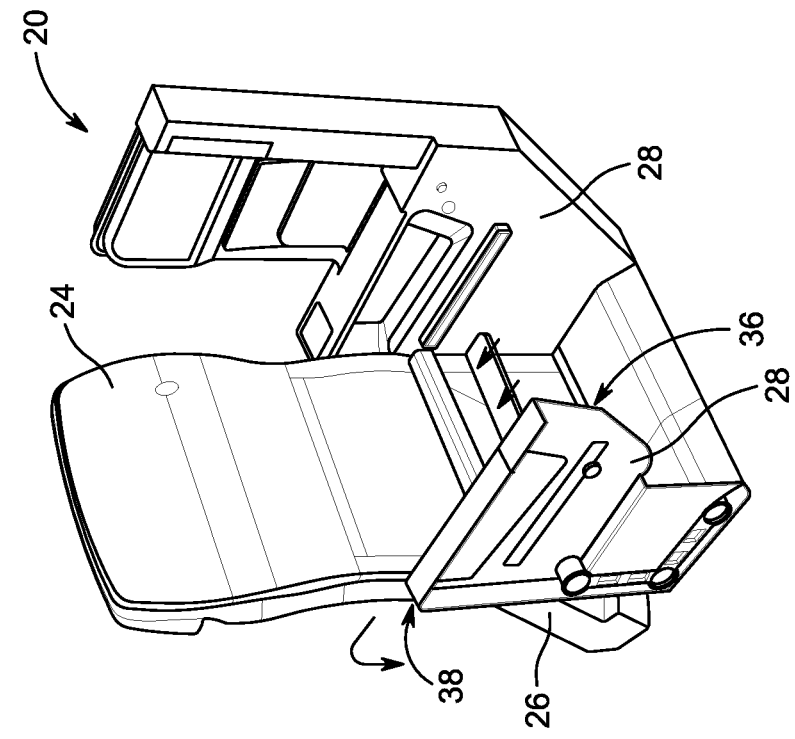
FIG. 6 is a front perspective view of the passenger seat of FIG. 5 showing seat bottom tracking toward the second position.
Figure 5:
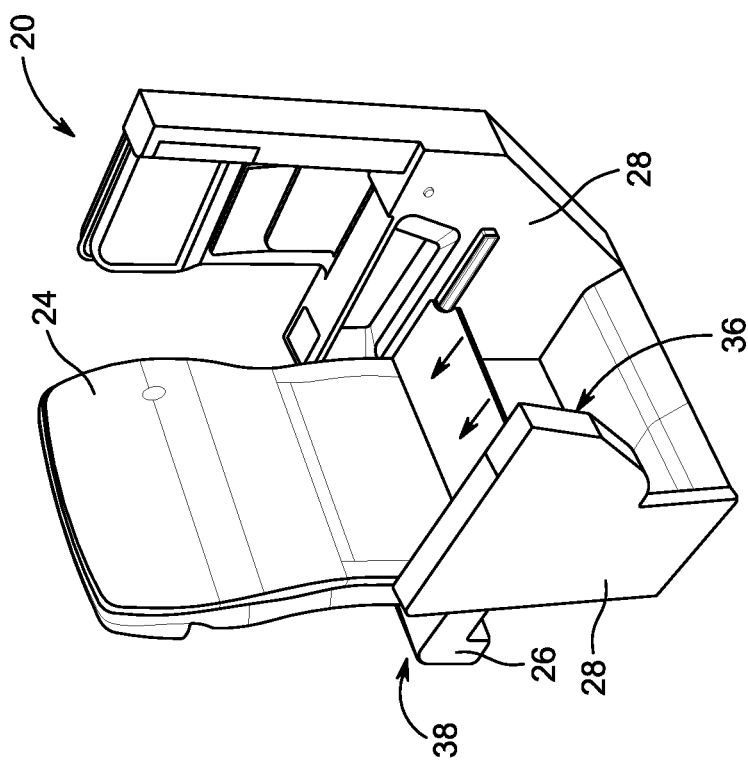
FIG. 5 is a front perspective view of one of the passenger seats of FIG. 1 showing seat bottom tracking toward the second position.

Referring to FIGS. 5 and 6, with the seat back 24 moved to and locked in place at the second position near the forward end 38 of the arm assemblies 28, the seat bottom 26 tracks from the first position (shown in FIG. 4) toward the second position (shown in FIG. 5), and ultimately to the second position (shown in FIG. 6). Whereas the seat back 24 remains substantially erect as the seat back tracks between the first and second positions, the seat bottom 26 transitions from prone to erect from the first position to the second position, and erect to prone from the second position to the first position. As shown, the seat bottom 26 tracks below the seat back 24 such that the seat bottom can remain in the first position as the seat back tracks between the first and second positions to provide forward-facing seating or rear-facing seating. In some embodiments, the seat bottom 26 may track horizontally to a stopping point and then rotate upward or downward to stow (shown in FIG. 6).

Figure 7:
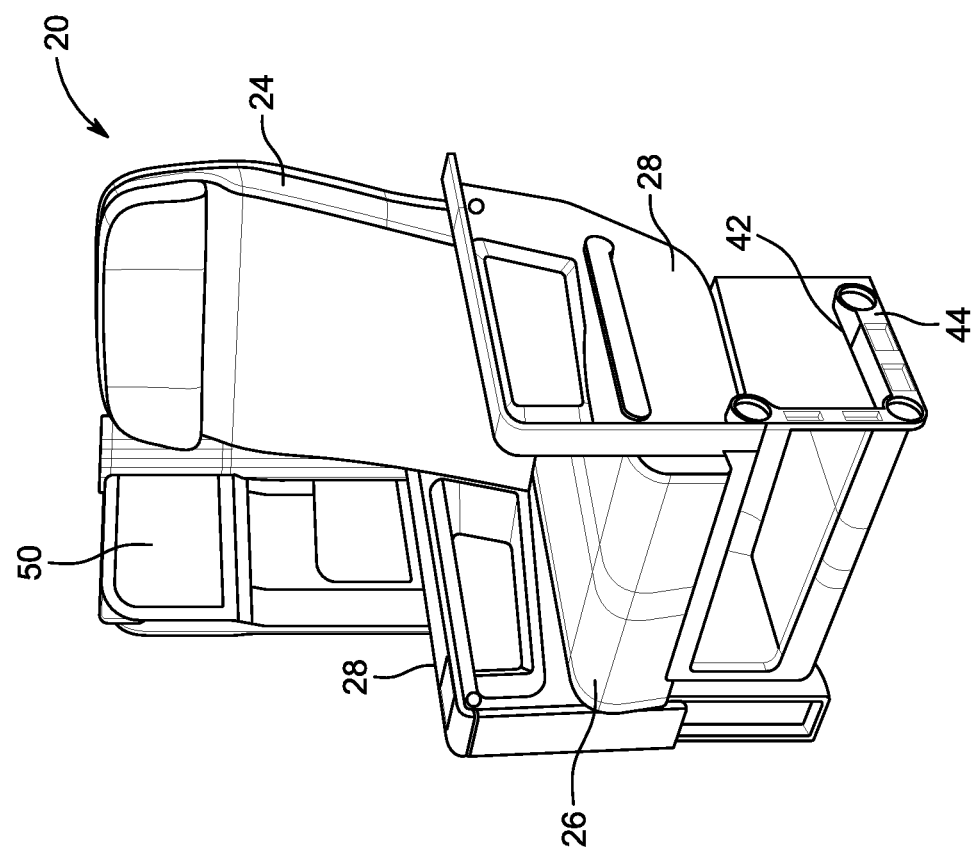
FIG. 7 is a front perspective view of one of the passenger seats of FIG. 1 shown with each of the seat back and seat bottom is their respective first position for forward-facing seating.
Figure 8:
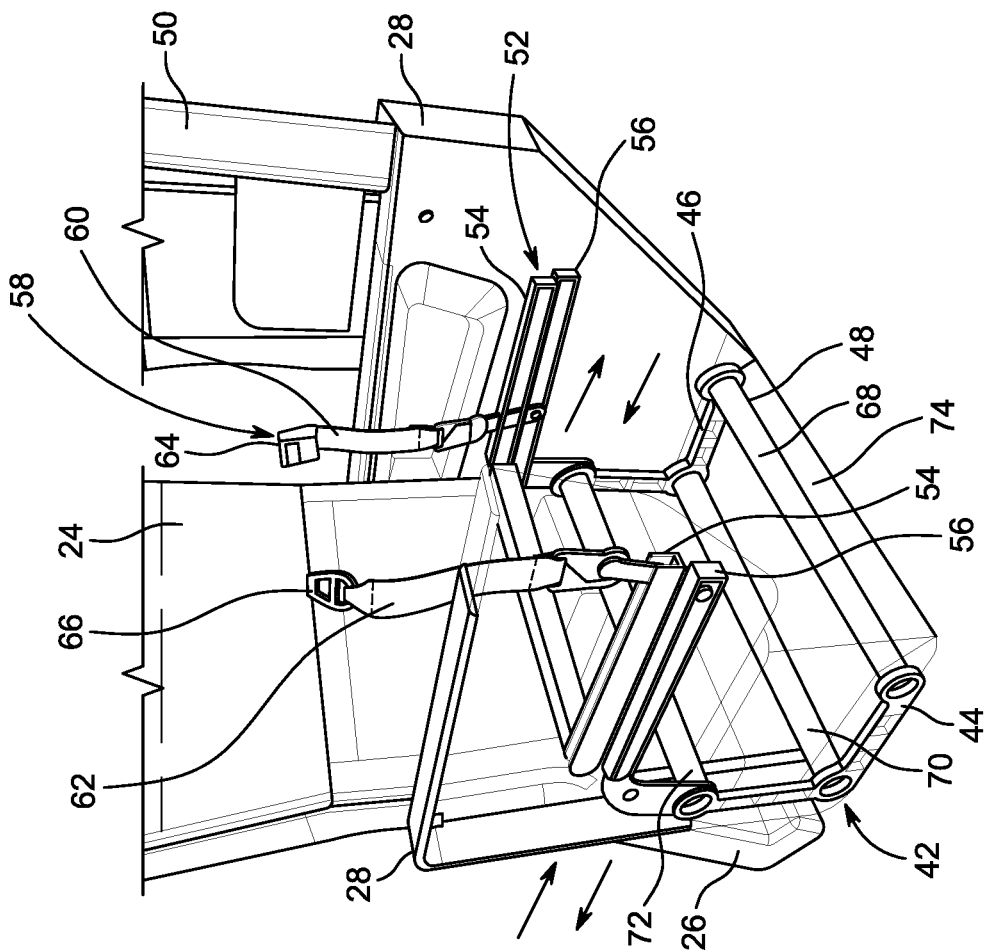
FIG. 8 is a fragmentary front perspective view of one of the passenger seats of FIG. 1 showing the seat back and seat bottom guide tracks and seat belt tracking.

Referring to FIGS. 7 and 8, one of the passenger seats 20 is shown with each of the seat back 24 and the seat bottom 26 in their respective first position corresponding to the forward-facing seat configuration. The arm assemblies 28 may sit atop a seat frame 42 including spaced left-hand and right-hand spreaders 44, 46 interconnected through a plurality of transverse beams 48. In some embodiments, the passenger seat 20 may include a privacy partition 50 disposed atop one of the arm assemblies 28. The privacy partition 50 may be affixed atop the arm assembly 28 and extends upwardly to about a height of a top of the seat back 24 and forward at least partway along a length of the arm assembly. The privacy partition 50 enhances privacy between laterally-adjacent passenger seats and may serve to locate a literature pocket, personal electronic device storage, seat controls, lighting and other amenities serving the seated passenger. The privacy partition 50 may be fixed or may transition between stowed and deployed positions, for example, by sliding along a track atop the arm assembly 28.

Referring to FIG. 8, each passenger seat 20 further includes a track assembly 52 generally including seat back guide tracks 54 affixed along facing inboard sides of the spaced arm assemblies 28 along which seat back trunnions engaged therein travel as the seat back 24 tracks between the first and second positions of the seat back, and seat bottom guide tracks 56 affixed along facing inboard sides of the spaced arm assemblies 28 along which seat bottom trunnions engaged therein travel as the seat bottom 26 tracks between the first and second positions of the seat bottom. The seat back guide tracks 54 are disposed spaced above the seat bottom guide tracks 56 such that the seat back 24 tracks above the seat bottom 26 to allow the seat bottom to remain in the first position while the seat back tracks between the first and second positions for forward-facing and rear-facing seating, respectively. In some embodiments, each of the seat back and seat bottom guide tracks 54, 56 is an elongate linear track having a length determining the amount of travel of the respective seat back 24 and seat bottom 26. In some embodiments, the guide tracks 54, 56 are provided in pairs symmetrically arranged about the arm assemblies 28 to stably support the tracking seat elements while maintaining squareness.

Each passenger seat 20 further includes a seat belt 58. In some embodiments, the seat belt 58 is provided in two separate parts including a first part 60 and a second part 62. The first part 60 terminates at one end in a buckle 64 and the second part 62 terminates at one end in a tongue 66 that detachably engages in the buckle. One or both of the first and second parts 60, 62 may include an adjustable length strap. Each of the first and second parts 60, 62 anchors to one of the seat back or seat bottom guide tracks 54, 56. As shown, the first and second seat belt parts 60, 62 are slidably engaged to travel along the seat bottom guide tracks 56 such that the seat belt 58 can be used as a seat belt in each of the forward-facing and rear-facing seat configurations. In addition to use as passenger restraint, the seat belt 58 can also be used as a securement strap for items when each of the seat back 24 and seat bottom 26 are in their respective second position and an item is stored between the arm assemblies 28. The seat belt parts 60, 62 may track manually along the seat bottom guide tracks 56 and engage in the tracks aft of the seat bottom 26 engagement in the tracks to allow the seat bottom to track freely without interference from the seat belt 58. The seat belt 58 is usable as a seat belt or a securement strap in any combination of the first and second positions of the seat back 24 and the seat bottom 26.

The seat frame 42 includes the spaced left-hand and right-hand spreaders 44, 46 and the plurality of transverse beams 48. In some embodiments, the plurality of transverse beams 48 includes two spaced floor beams 68, 70 and a third beam 72 positioned above the forward one of the floor beams. In some embodiments the transverse beams 48 are arranged in an "L" where the beams are positioned substantially out of the space between the arm assemblies 28 to maximize under-seat space and accommodate a large item secured in that space. At least one of the plurality of transverse beams 48 is accessible as a tie-down point for securing items when the seat bottom 26 and the seat back 24 are each in their respective second position. In some embodiments, a base 74 covers at least the two floor beams 68, 70 and supports an item placed thereon when at least the seat bottom 76 is in the second position.

Figure 9:
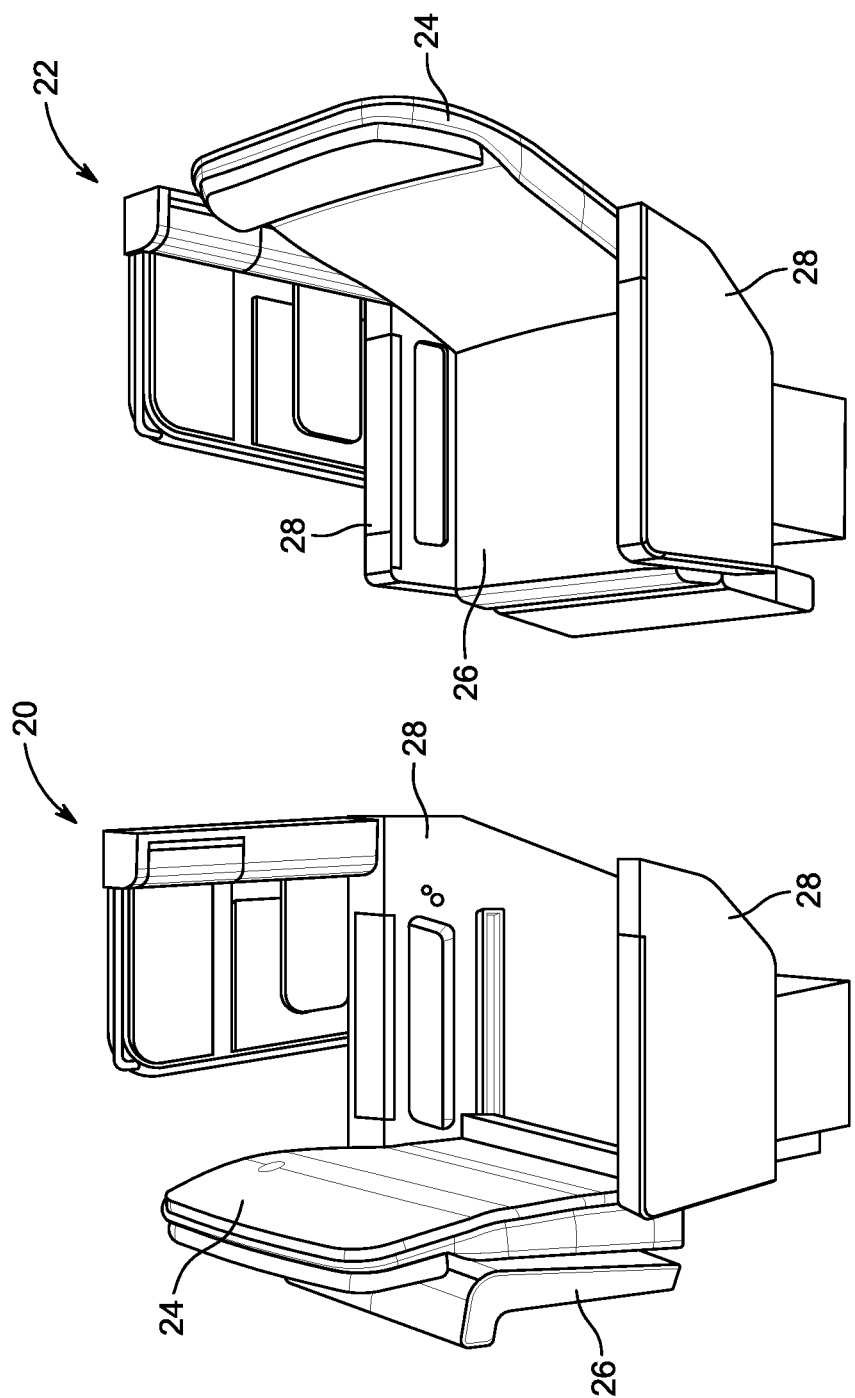
FIG. 9 is a side perspective view of the passenger seats of FIG. 1 showing the left seat reconfigured for storing large items.

Referring to FIG. 9, the forward passenger seat 20 is shown with each of the seat back 24 and the seat bottom 26 fully in their respective second position. This configuration substantially vacates the space between the spaced arm assemblies 28 to accommodate large items such as sporting equipment, musical instruments, pet carriers, etc. The vacant space can also be used to accommodate a pet traveling with the passenger in the aft passenger seat 22. In some embodiments, the seat bottom 26 in the respective second position may rotate upward against the front of the seat back 24 and may secure in place with a strap or the like.

Benefits of the reconfigurable passenger seat embodiments disclosed herein include an achievable face-to-face seating arrangement and more storage space for items, among other benefits. The reconfigurable seat further allows an airline to sell unused seats, and the passenger seat can be converted during the flight as requested. Unused locking points can further be used as tie-downs for securing items.

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

What is claimed is:

1. A convertible passenger seat, comprising:
spaced arm assemblies;
a seat back configured to track between the spaced arm assemblies between a first position near an aft end of the spaced arm assemblies and a second position near a forward end of the spaced arm assemblies;
seat back locking points on facing inboard sides of the aft and forward ends of the spaced arm assemblies in which seat back trunnions engage therein to lock the seat back in place in the first or second position of the seat back; and
a seat bottom configured to track between the spaced arm assemblies between a first position between the spaced arm assemblies and a second position at the forward end of the spaced arm assemblies;

wherein the first position of the seat back together with the first position of the seat bottom corresponds to a forward-facing seat configuration, the second position of the seat back together with the first position of the seat bottom corresponds to a rear-facing seat configuration or an ottoman configuration, and the second position of the seat back together with the second position of the seat bottom corresponds to a storage configuration.

2. The convertible passenger seat according to claim 1, wherein the seat back is erect in each of the first and second positions of the seat back, the seat bottom is prone in the first position of the seat bottom, and the seat bottom is erect in the second position of the seat bottom.

3. The convertible passenger seat according to claim 1, wherein the seat back and the seat bottom are decoupled to move independently between their respective first and second positions.

4. The convertible passenger seat according to claim 1, further comprising a track assembly including:

seat back guide tracks affixed along facing inboard sides of the spaced arm assemblies along which the seat back trunnions engaged therein travel as the seat back tracks between the first and second positions of the seat back; and seat bottom guide tracks affixed along facing inboard sides of the spaced arm assemblies along which seat bottom trunnions engaged therein travel as the seat bottom tracks between the first and second positions of the seat bottom.

5. The convertible passenger seat according to claim 4, wherein the seat back guide tracks are disposed spaced above the seat bottom guide tracks such that the seat back tracks above the seat bottom.

6. The convertible passenger seat according to claim 4, further comprising a seat belt having opposed ends slidably engaged in the seat back guide tracks or the seat bottom guide tracks, the seat belt usable as a seat belt or a securement strap in any combination of the first and second positions of the seat back and the seat bottom.

7. The convertible passenger seat according to claim 1, further comprising a seat frame including spaced spreaders and a plurality of transverse beams, wherein at least one of the plurality of transverse beams is accessible as a tie-down point for securing items when the seat bottom and the seat back are each in their respective second position.

8. The convertible passenger seat according to claim 7, further comprising a base covering at least two of the transverse beams for supporting an item placed thereon when at least the seat bottom is in the second position.

9. The convertible passenger seat according to claim 1, further comprising a privacy partition affixed atop one of the spaced arm assemblies, the privacy partition extending upwardly to about a height of a top of the seat back and forward at least partway along a length of the one of the spaced arm assemblies.

10. A passenger seat reconfigurable for seating or storage, comprising:

fixed seat elements positioned spaced apart;

a seat back supported between the fixed seat elements configured to track between a first position locked in place near an aft end of the fixed seat element and a second position locked in place near a forward end of the fixed seat elements;

a seat bottom supported between the fixed seat elements configured to track between a first position secured between the fixed seat elements and a second position secured at the forward end of the fixed seat elements;

a track assembly including seat back guide tracks affixed along facing inboard sides of the fixed seat elements along which seat back trunnions engaged therein travel as the seat back tracks between the first and second positions of the seat back, and seat bottom guide tracks affixed along facing inboard sides of the fixed seat elements along which seat bottom trunnions engaged therein travel as the seat bottom tracks between the first and second positions of the seat bottom;

wherein the seat back guide tracks are disposed spaced above the seat bottom guide tracks such that the seat back movement is decoupled from seat bottom movement and the seat back tracks above the seat bottom;

wherein the seat back remains erect as the seat back tracks between the first and second positions of the seat back;

wherein the seat bottom transitions from prone to erect as the seat bottom tracks from the first position to the second position of the seat bottom; and wherein the first position of the seat back together with the first position of the seat bottom corresponds to a forward-facing seat configuration, the second position of the seat back together with the first position of the seat bottom corresponds to a rear-facing seat configuration or an ottoman configuration, and the second position of the seat back together with the second position of the seat bottom corresponds to a storage configuration.

* * * * *